US010771316B1

(12) United States Patent
Plenderleith et al.

(10) Patent No.: US 10,771,316 B1
(45) Date of Patent: Sep. 8, 2020

(54) DEBUGGING OF A NETWORK DEVICE THROUGH EMULATION

(71) Applicant: Amazon Technologies, Inc., Seattle, WA (US)

(72) Inventors: Jamie Plenderleith, Dublin (IE); Guillaume Boissier, Dublin (IE); Alan Michael Judge, Dublin (IE)

(73) Assignee: Amazon Technologies, Inc., Seattle, WA (US)

( * ) Notice: Subject to any disclaimer, the term of this patent is extended or adjusted under 35 U.S.C. 154(b) by 17 days.

(21) Appl. No.: 15/827,961

(22) Filed: Nov. 30, 2017

(51) Int. Cl.
*H04L 12/24* (2006.01)
*H04L 12/707* (2013.01)
*H04L 12/26* (2006.01)

(52) U.S. Cl.
CPC ...... *H04L 41/0663* (2013.01); *H04L 41/0677* (2013.01); *H04L 41/145* (2013.01); *H04L 45/22* (2013.01); *H04L 43/0817* (2013.01)

(58) Field of Classification Search
None
See application file for complete search history.

(56) References Cited

U.S. PATENT DOCUMENTS

| 5,600,630 | A | * | 2/1997 | Takano | H04L 45/10 370/218 |
| 6,073,248 | A | * | 6/2000 | Doshi | H04J 14/0227 398/1 |
| 6,751,191 | B1 | * | 6/2004 | Kanekar | H04L 12/4641 370/217 |
| 6,910,148 | B1 | * | 6/2005 | Ho | H04L 45/00 714/4.4 |
| 6,954,463 | B1 | * | 10/2005 | Ma | H04L 45/00 370/392 |
| 7,362,709 | B1 | * | 4/2008 | Hui | H04L 45/00 370/221 |
| 7,760,656 | B1 | * | 7/2010 | Yuan | H04L 43/50 370/242 |
| 7,937,481 | B1 | * | 5/2011 | Sandstrom | G06F 11/004 709/219 |
| 9,712,406 | B2 | * | 7/2017 | Chu | H04L 41/145 |
| 2002/0194362 | A1 | * | 12/2002 | Rawlins | H04L 45/10 709/235 |
| 2004/0001485 | A1 | * | 1/2004 | Frick | H04L 41/0663 370/389 |

(Continued)

*Primary Examiner* — Ayaz R Sheikh
*Assistant Examiner* — Tarell A Hampton
(74) *Attorney, Agent, or Firm* — Klarquist Sparkman, LLP

(57) ABSTRACT

An emulation mode for network devices is described as a means of isolating a defective network device from real network traffic, while continuing to transmit faux traffic to the defective network device, wherein the faux traffic is intentionally dropped. The emulation mode allows the defective network device to be tested in an environment that appears real, without impacting user traffic. A management server can control one or more neighbor network devices and place them in the emulation mode as a way to isolate and test the defective network device. In the emulation mode, the neighbor network device monitors for packets that, based on previous routing history, would be sent to the defective network device and, instead, routes them to functioning network devices using a current FIB. A virtual RIB/FIB can also be used to route the same packets to the defective network device.

17 Claims, 10 Drawing Sheets

(56) References Cited

U.S. PATENT DOCUMENTS

| | | | |
|---|---|---|---|
| 2004/0225738 A1* | 11/2004 | Patel | H04L 29/06 709/226 |
| 2005/0147095 A1* | 7/2005 | Guerrero | H04L 12/1881 370/390 |
| 2008/0267192 A1* | 10/2008 | Blinick | H04L 49/555 370/395.7 |
| 2008/0298265 A1* | 12/2008 | Filsfils | H04L 43/0852 370/252 |
| 2010/0077063 A1* | 3/2010 | Amit | H04L 12/12 709/221 |
| 2011/0019539 A1* | 1/2011 | Suzuki | H04L 49/3009 370/225 |
| 2012/0026900 A1* | 2/2012 | Chandrasekaran | H04L 41/0672 370/252 |
| 2015/0370675 A1* | 12/2015 | Chattopadhyay | G06F 11/263 714/33 |
| 2016/0020993 A1* | 1/2016 | Wu | H04L 45/14 370/392 |
| 2016/0227300 A1* | 8/2016 | Lai | H04Q 11/0005 |
| 2016/0274187 A1* | 9/2016 | Menon | G01R 31/31718 |
| 2017/0111236 A1* | 4/2017 | Bielenberg | H04L 41/22 |
| 2017/0127301 A1* | 5/2017 | Sharma | H04W 4/70 |
| 2018/0254963 A1* | 9/2018 | Romero | H04L 43/0805 |

* cited by examiner

US 10,771,316 B1

DEBUGGING OF A NETWORK DEVICE THROUGH EMULATION

BACKGROUND

Network switches play a critical role in large computer networks, such as those found in a data center. Server computers in the network can be divided into racks, and network switches can connect the server computers within a rack to routers in the data center. Data passed by switches is generally divided into a series of packets that can be transmitted between devices. Generally, network switches have two primary planes: a control plane and a data plane. The control plane is a management plane that configures the data plane. The data plane receives packets on input ports and transmits the received packets to output ports based on the configuration. Both the data plane and the control plane can become non-functional for a number of reasons. For example, a processor crash can occur, or other hardware or software malfunction. Any of these events can cause the entire switch to be offline for an extended period. For example, the control plane operating system may need to go through a boot operation before the switch can become operational again. As a result, neighbor routers that stop receiving announcements from the switch can remove the switch from their forwarding tables. Multiple users of the network can therefore be impacted by a switch outage if the users are executing software on a server computer that receives network traffic through the switch.

Before the switch is taken offline for servicing, the network traffic is diverted until the traffic to the switch is below a threshold level. However, any changes to the network switch, including changes of the data plane forwarding tables or the control plane state, can result in masking of a defect in the network switch making the switch more difficult to troubleshoot.

DETAILED DESCRIPTION

Figure 1:
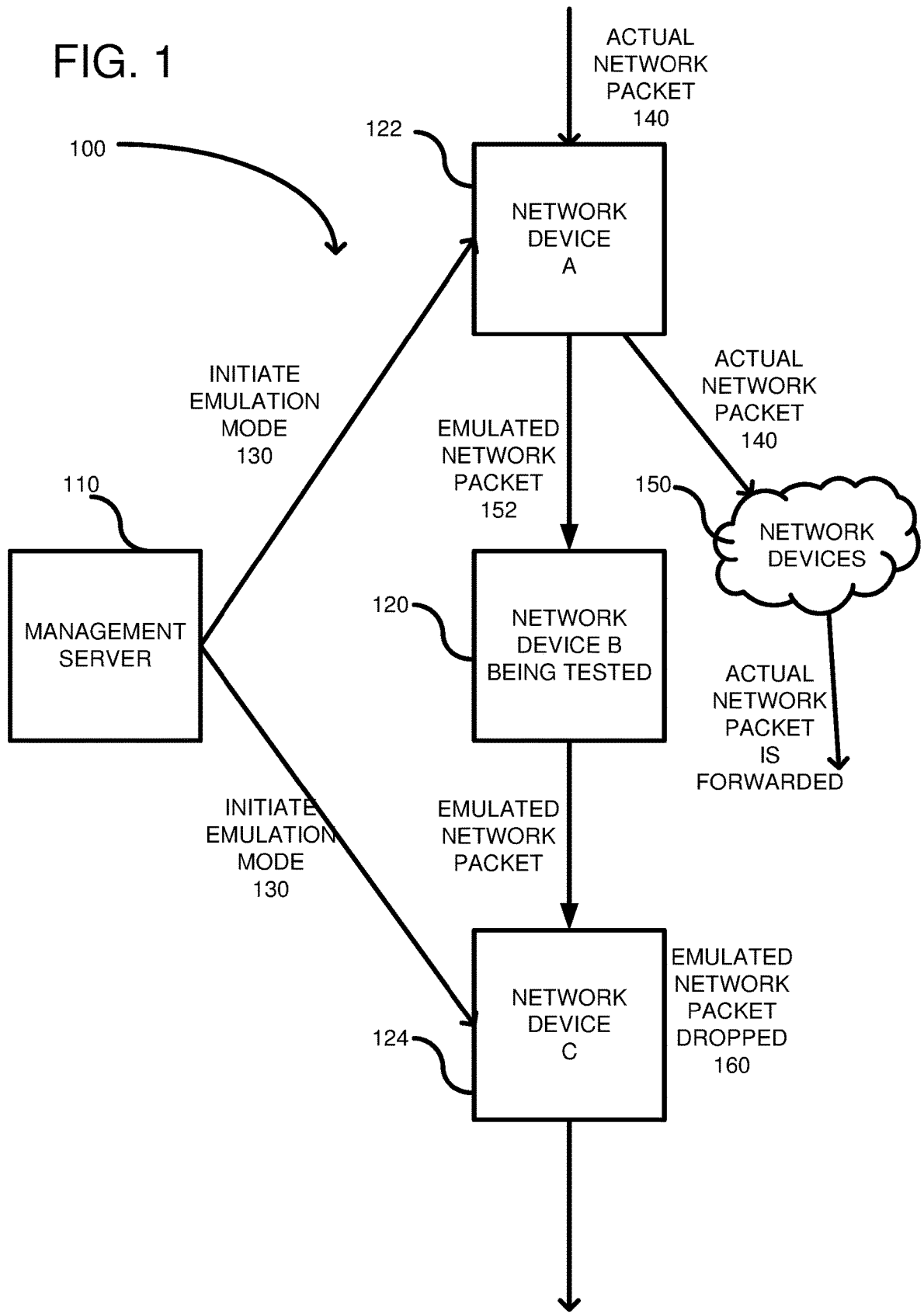
FIG. 1 is a system diagram showing a network switch being tested by placing neighbor switches in an emulation mode.

A network device (e.g., routers, switches, etc.) can exhibit problematic behavior and need to be removed from the network. However, the network device typically carries traffic so there is limited time to test/debug/reproduce issues on the network device without impacting users. An emulation mode for network devices is described as a means of isolating a defective network device from real network traffic, while continuing to transmit faux traffic to the defective network device, wherein the faux traffic is intentionally dropped by other network devices if it passes through the network device being tested. The term "emulation mode" describes that the defective network device to be tested in an environment that appears real (from the perspective of the defective network device), without impacting user traffic. Other terms can be used in place of emulation, such as simulation. Whatever term is used, the network device forwards packets differently depending on whether it is in an emulation mode or a normal operating mode. A management server can control one or more neighbor network devices (to the defective network device) and place them in the emulation mode as a way to isolate and test the defective network device. In the emulation mode, the neighbor network device monitors for packets that, based on previous routing history, would be sent to the defective network device and, instead, routes them to functioning network devices using a current FIB (Forwarding Information Base). A virtual RIB (Routing Information Base)/FIB can also be used to route the same packets to the defective network device. Data packets received by the emulated network device from the defective network device are immediately dropped, while control packets are acknowledged by the emulated network device to simulate normal operation.

For example, for a given device X that is identified as defective (e.g., the device appears to drop/blackhole traffic, misroute traffic, emit errors, etc.), one or more of the following can be performed: All devices physically connected to X (i.e., so-called neighbor devices) are instructed that X is going to be 'isolated' for testing; the neighbor network devices enter an emulation mode wherein for routing or switching decisions, if the destination is X, then traffic is sent to both a different destination so as to bypass X and a best effort is made to send to X. When a neighbor network device receives traffic from X, such network traffic is immediately discarded. In some embodiments, if X is operational to receive instructions to change configuration, then X can be configured such that all outbound traffic from it is encapsulated in a new type of packet, so that devices receiving traffic from X automatically drop the packet.

In another example, the same isolation steps can be performed for multiple devices in a network so as to isolate a section of the network. For example, a tier of a network can be placed in emulation mode so as to test all network devices coupled to the tier.

FIG. 1 is an embodiment of a system 100 for emulating a network device within a network. The system 100 includes a management server 110 that detects irregularities in a network device B 120 coupled between a network device A 122 and a network device C 124. In this example, network device A 122 and network device C 124 are operating normally and are directly coupled to network device B 124 and are called "neighbors" of network device B. The management server can obtain topology information for the network (from another service, for example) so that it can discover all of the neighbor information for network device B. The management server 110 can trigger the emulation mode by transmitting a command, shown at 130, to the neighbor devices A and C of network device B. When network device A receives an actual network packet 140 (termed an actual packet because it is not a test packet; one example actual packet is a user packet), it transmits two separate packets on different ports. First, according to its normal routing procedures, network device A 122 uses a forwarding table (not shown) to route the actual network packet to a neighbor network device that is not being tested, as shown at 150. Second, network device A 122 transmits an emulated network packet 152 to network device B. As described further below, each network packet 140, 152 are transmitted on different ports of the network device A 122 using different forwarding tables. The actual network packet 140 is so-termed because it is routed to proceed to a final destination and is a user packet. By contrast, the emulated network packet 152 is routed with an understanding that the packet will be dropped either by network device B or network device C. It should be understood that emulated packets sent to the network device being tested can be control plane packets or data plane packets.

As explained more fully below, on a control plane of network device A, a virtual instance is created for the appropriate routing engine(s) (OSPF, BGP, etc.). Additionally, a virtual RIB is generated and is stored in a control plane. The virtual RIB is not used to update the FIB in a data plane. Rather, the virtual RIB ensures that route updates from the isolated network device B are not processed by network device A into the main RIB and FIB. Route updates relayed through network device A that would have been received at network device B, are not be forwarded, thus keeping network device B 120 as close to its original malfunctioning state as possible. Nonetheless, route updates that are required to maintain routing state consistency continue to be forwarded so that network device B believes that operations are normal. The virtual RIB allows traffic to flow to its previous route—i.e. to malfunctioning network device B.

There are a number of techniques that can be used for forwarding packets. In one example, all traffic is sent to a processor within the control plane for forwarding to both the previous destination (network device B) and a new destination (network device 150). Alternatively, the data plane can continue to forward packets, but duplicate packets are sent to the processor in the control plane for forwarding to device B. Multicast and port mirroring device features are other techniques that can be used for packet duplication. As explained more fully below, network device C drops non-control-plane traffic from network device B, as shown at 160, while control plane packets continue to be processed to maintain neighbor relationships.

Figure 2:
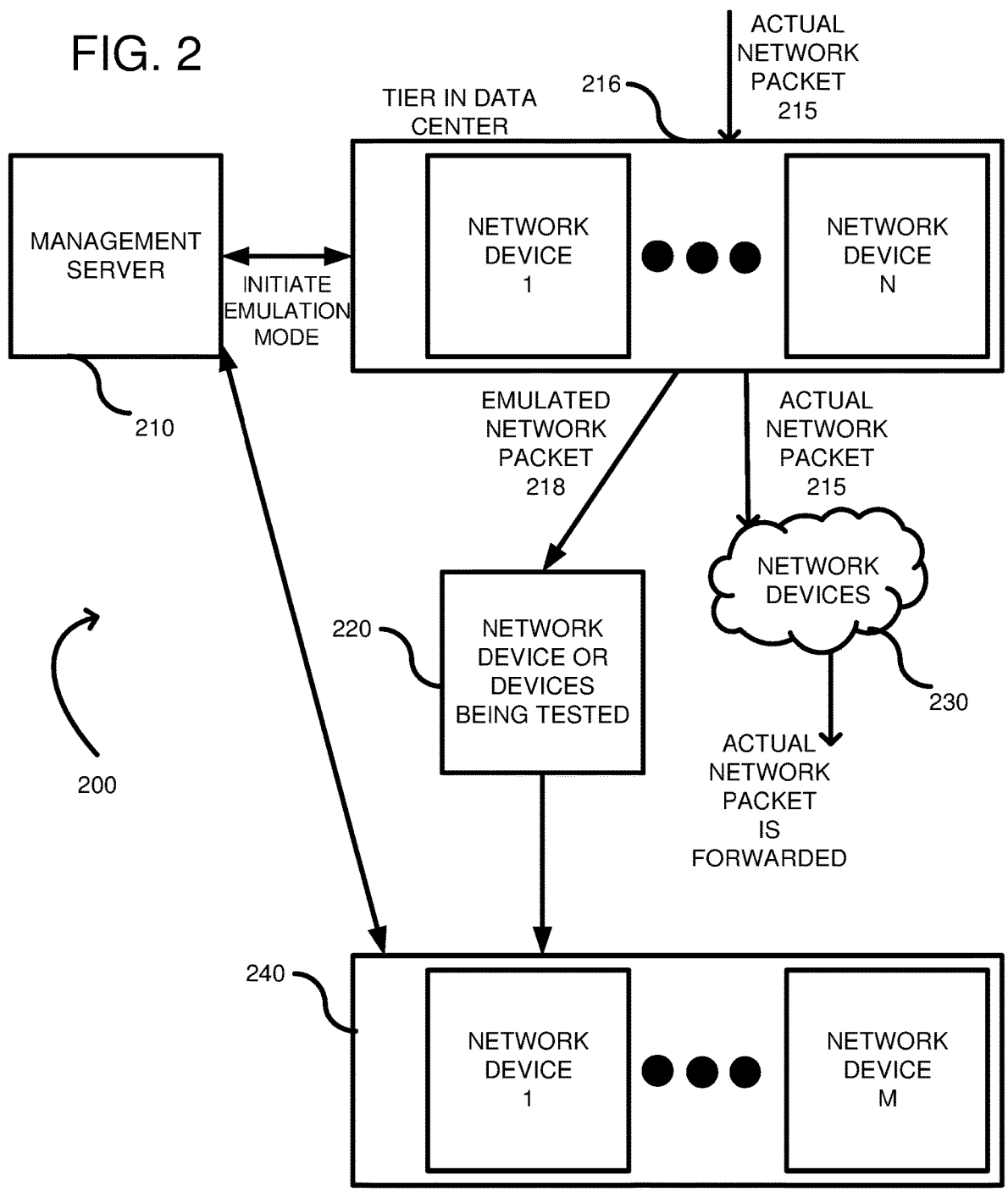
FIG. 2 illustrates that groups of network devices can be placed in emulation mode in parallel.

FIG. 2 shows a system 200 wherein multiple network devices can be placed in emulation mode in parallel. A management server 210 can initiate the emulation mode through a command to a tier or grouping 216 of network devices, shown as network device 1 through network device N (where N is any integer value). The command can be in the form of an Application Programming Interface (API) command and the tier 216 can be part of a data center. Similar to FIG. 1, an actual packet 215 received by the tier 216 is routed as an emulated packet 218 to one or more network devices 220. At a same time (or close in time), the actual network packet 215 is routed along a different network path to network devices 230 for forwarding to the packet's ultimate destination (e.g., the destination indicated by the packet's destination address). The emulated network packet 218, by contrast, is dropped either by the network devices 220 being tested or by neighbor network devices 240, should the network devices 220 forward the emulated packet. The neighbor network devices 240 can likewise be within a tier of a data center and can include network devices 1 through M (where M is any integer value). The management server places groups of network devices 216 and 240 in emulation mode so that all network devices directly coupled to the network device being tested 220 are in emulation mode. In this way, the management server 210 can control all network traffic in and out of the network device being tested. Thus, as illustrated by FIG. 2, the management server 210 (also called an emulation management server) can place multiple network devices in an emulation mode in parallel. Similarly, multiple network devices 220 can be tested in parallel. The network devices 220 can be unaware that an emulation mode is being used, so that such devices 220 operate under what appears as a normal operating environment wherein they receive and re-transmit network traffic as though it will be routed to a final destination, when the network traffic is actually intended to be dropped.

Figure 3:
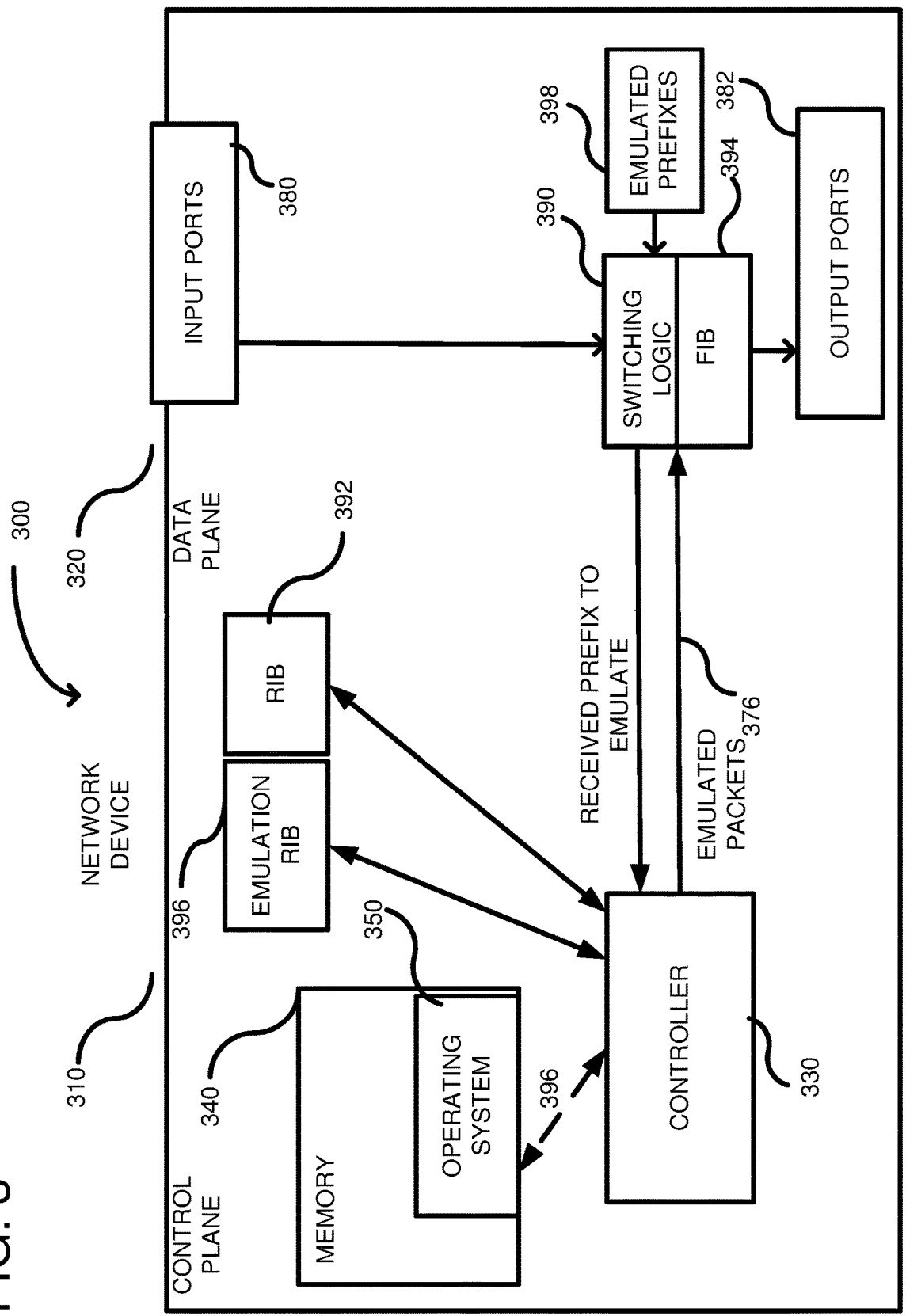
FIG. 3 shows details of an exemplary network device having a normal operating mode and an emulation mode.

FIG. 3 is a first embodiment of a network device 300 that can enter an emulation mode for testing a neighbor network device. The network device 300 includes a control plane 310 and a data plane 320. The control plane 310 is generally a management layer for configuring, updating, and controlling the data plane 320. The control plane includes a controller 330, which can be a Central Processing Unit (CPU), processor, application-specific integrated circuit (ASIC), microcontroller, or any hardware logic that can receive packets and provide switch management and control in response thereto. The controller 330 has access to a memory 340 that can be a Dynamic Random Access Memory (DRAM), Flash memory, or other type of RAM or ROM. The memory 340 is used to store an operating system 350 for the device 300. Although a single memory is shown, the memory 340 can be divided into multiple memories and even memories of different types. A communications bus 376 allows communications between the controller 330 and the data plane 320. The communications bus 376 can be any desired bus type, such as PCI, PCIe, ISA, etc. The data plane 320 includes input ports 380 and output ports 382 used for receiving and sending network packets, respectively. Switching logic 390 is positioned intermediate the input and output ports. The switching logic 390 includes hardware for switching in accordance with layer 2, layer 3 or both.

The control plane 310 includes two separate RIBs. A first RIB 392 is for a normal operating mode and is used to program a FIB 394 (also called a non-virtual or real-time FIB) within the switching logic 390 of the data plane 320. A second RIB 396 is an emulation RIB (or a virtual RIB, but also called a virtual FIB) that is used when the network device 300 switches to an emulation mode. Whether called a RIB or FIB, the emulation RIB 396 includes at least prefixes that are to be emulated and potentially forwarding information associated with the network device being tested. Thus, the controller 330 switches between RIB 392 and RIB 396 based on whether the network device 300 is in a normal operating mode or an emulation mode, respectively. The RIB 392 is updated based on updates received from other network devices. By contrast, RIB 396 is not updated, but is generated by the controller 330 based on a received command to store state information because an emulation mode is being initiated. When this command is received, the controller 330 saves the state of the FIB 394 and any current state information associated with a communication protocol for communicating with other network devices. The state information is stored in the emulation RIB 396, which is used as a storage for protocol state and for current FIB state. Thus, the emulation RIB 396 is not a RIB in the traditional sense that is used to program the FIB 390. Indeed, it is the opposite as the FIB 394 is used to program the RIB 396. Additionally, the RIB 396 stores the FIB state to see what prefixes were being sent to an output port 382 associated with a network device being tested.

The data plane 320 includes emulated prefixes 398 stored in a memory, which represent prefixes of packets to be emulated. After the emulation mode is entered, the network device 300 can receive information (control plane packets) needed to populate the emulated prefix memory 398. Alternatively, the controller 330 can search through the current FIB 394 to generate the emulated prefixes 398. For example, the controller can analyze what prefixes are bound for the port associated with the network device being tested at the time that emulation mode was entered and those prefixes can then be used to generate the emulated prefix table 398.

As shown, when the switching logic 390 detects that a received packet matches one of the emulated prefixes 398, the packet is transmitted to the controller 330 over the communications bus 376. The controller 330 then uses the emulation RIB 396 to obtain state information and FIB information at a point in time when the network device 300 was placed in an emulation mode. The controller 330 can then generate one or more emulated packets that are passed back through the switching logic 390 in order to transmit the one or more emulated packets to the network device under test. Additionally, the controller 330 can place the data plane 320 in a desired state so that a protocol associated with communicating with the network device being tested is a saved state from the emulation RIB 396.

Figure 4:
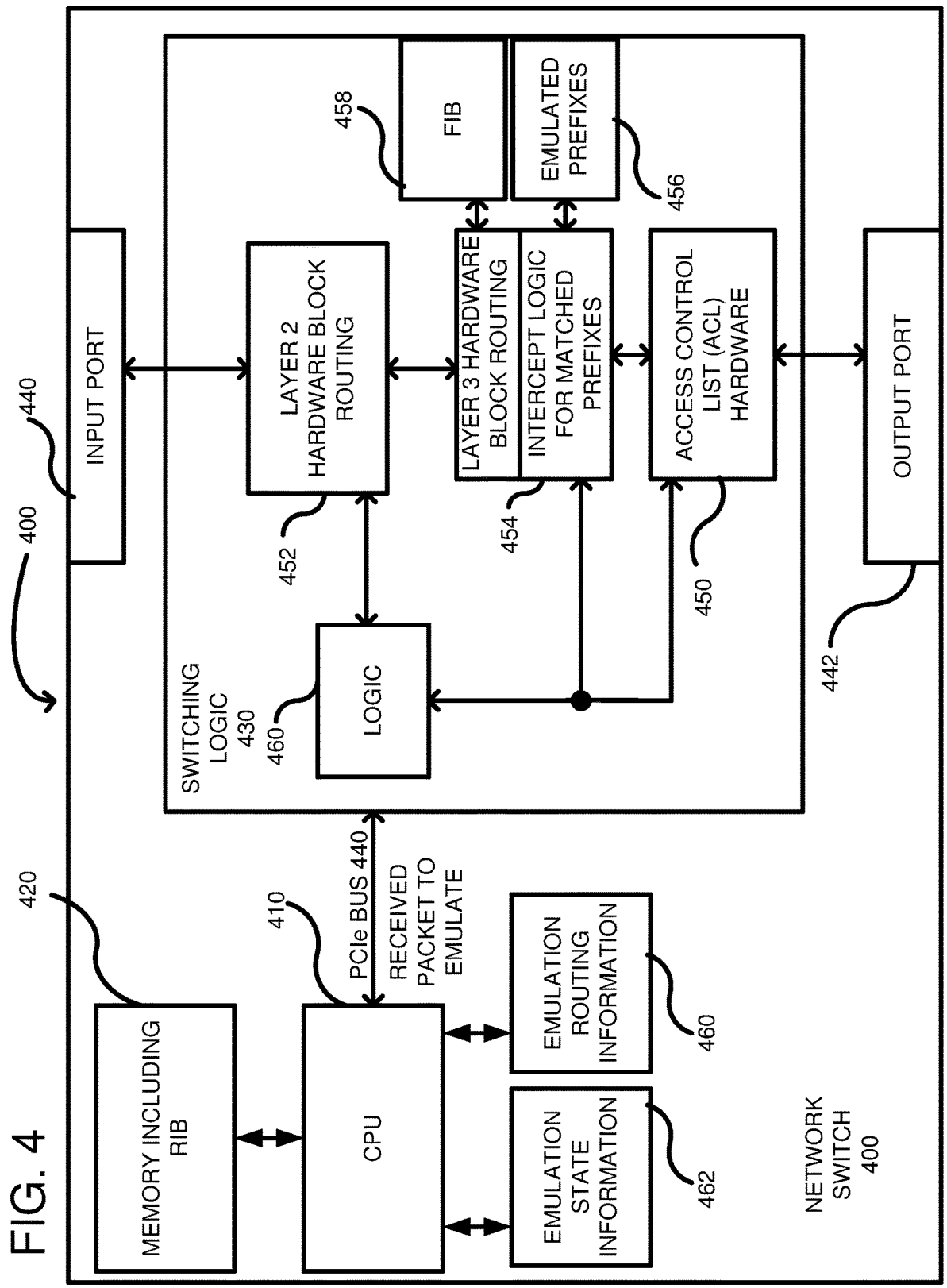
FIG. 4 shows further details of switching logic within a network device.

FIG. 4 shows a detailed example of an embodiment of a network device 400. In this embodiment, a CPU 410 is coupled to a memory 420 (that includes a RIB) and to switching logic 430 (also called packet handling logic) through a PCIe bus 440 (other protocols and bus types can be used). The switching logic 430 is positioned between an input port 440 and an output port 442, which are typically adapted to receive network cables, such as Ethernet cables or optical communication lines. The switching logic 430 can be a single ASIC integrated circuit or divided into multiple integrated circuits. The switching logic 430 can include multiple different hardware logic blocks including a Layer 2 hardware block 452, a Layer 3 hardware block 454, and an Access Control List (ACL) hardware block 450. The layer 2 hardware block 452 relates to an Ethernet layer and can forward packets based on MAC tables. The layer 3 hardware block 454 relates to forwarding based on a longest prefix match of an IP address using a FIB 458. The ACL block 450 relates to permissions and can include rules whether to drop packets. The different hardware blocks can be in a pipeline and additional hardware blocks can be added based on the design. The layer 3 hardware 454 can include intercept logic 454 that is used to monitor network packets for prefixes that match prefixes stored in table 456. The switching logic 430 can also include logic 460 (e.g., a CPU core or other logic) that can switch the switching logic 430 to any desired state.

The network device 400 includes a memory for storing emulation routing information 460 and emulation state information 462. In some embodiments, at least the emulation routing information 460 can be considered a virtual RIB and is used for storing forwarding information. The emulation routing information 460 and emulation state information 462 are not updated when the network switch 400 receives updates to the RIB 420 and FIB 458. Instead, the emulation routing information 460 and emulation state information 462 are generated by the CPU 410 upon receiving a command to enter an emulation mode. The emulation routing information 460 can be derived from the RIB 420 or FIB 458 and is an instantaneous capture of the forwarding information at a specific point of time. Thus, the network device 400 can use the emulation routing information 460 and emulation state information 462 to return to a previous state when packets were being forwarded to a neighbor device being tested. In the meantime, the real-time RIB 420 and FIB 458 are receiving routing updates indicating that a cost is high for sending packets to the network device being tested. In this way, the network device being tested is being taken off-line for resetting, replacing or otherwise repairing.

Figure 5:
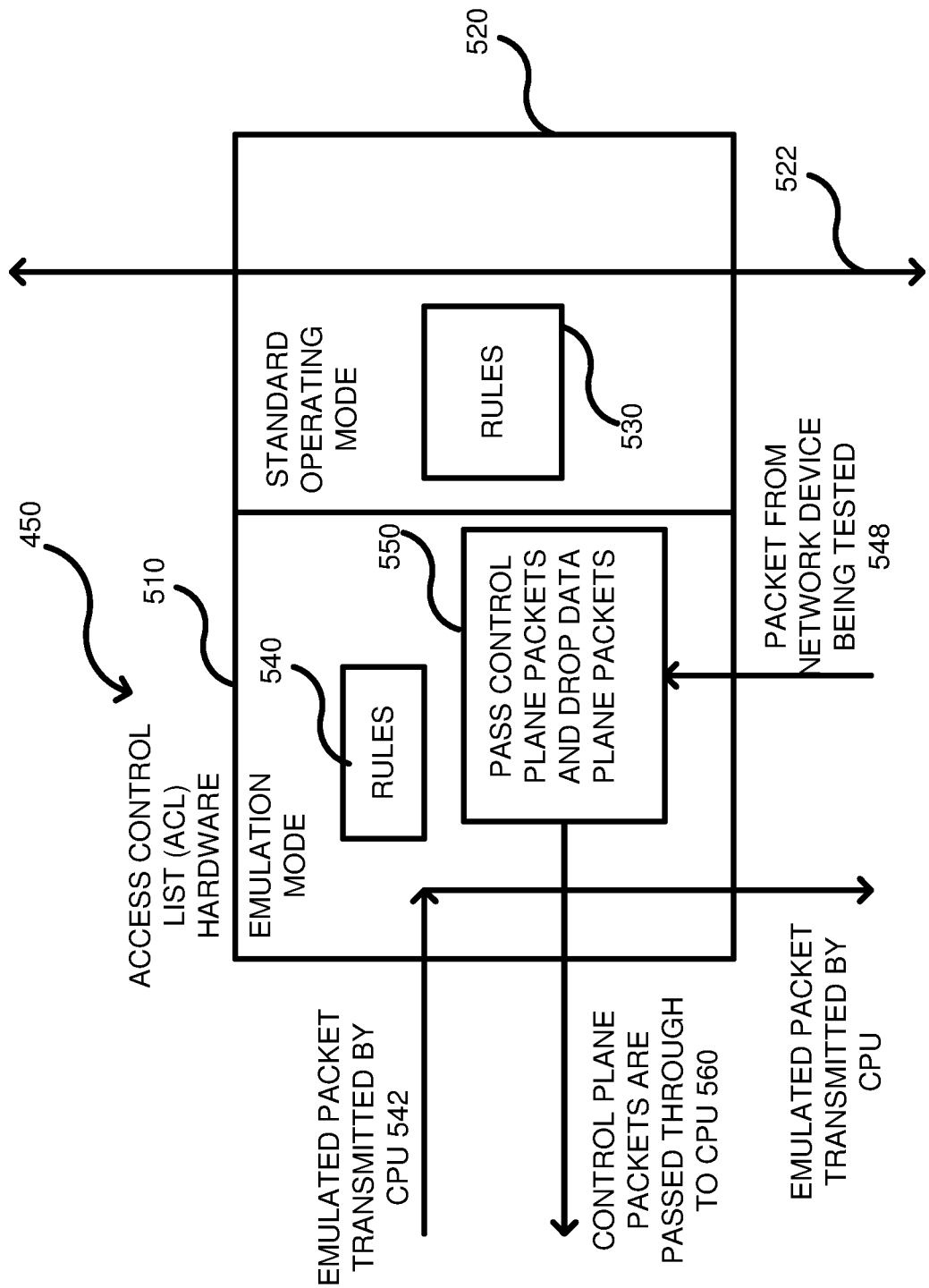
FIG. 5 shows Access Control List (ACL) hardware that can be within the switching logic of FIG. 4.

FIG. 5 illustrates further details of the ACL 450 of FIG. 4. The ACL 450 can operate in an emulation mode as indicated at 510 or a standard operating mode as indicated at 520. In the standard operating mode, rules 530 can be applied to the packets so as to determine whether the packets should be dropped or transmitted to a next hub. Packets passing through the ACL 450 in the normal operating mode 520 are depicted by arrow 522. In the emulation mode 510, rules 540 can be applied to packets transmitted by the CPU 410 as indicated at 542. The rules 540 are stored rules that were in place at a time when emulation mode was entered and can be stored in the emulation state information 462. These rules can be programmed into the ACL when the network device switches to an emulation mode. Additionally, the rules 540 are only applied to outgoing packets and not to incoming packets. For packets received from the network device being tested, as shown at 548, logic 550 analyzes the packets and drops any packets that are not destined for the control plane. Control plane packets are passed to the CPU as indicated at 560. Accordingly, the ACL 450 applies different rule sets 530, 540 based on whether the network device is in a standard operating mode 520 or an emulation mode 510. Additionally, the behavior of the ACL for received packets differs in both modes. In particular, in emulation mode, all data packets are dropped and all control plane packets are passed to the CPU. Thus, in emulation mode, for received packets the rules 540 are not applied. In the standard operating mode 520, control plane packets are also passed to the CPU, but data plane packets can pass through the ACL as indicated at 522.

Figure 6:
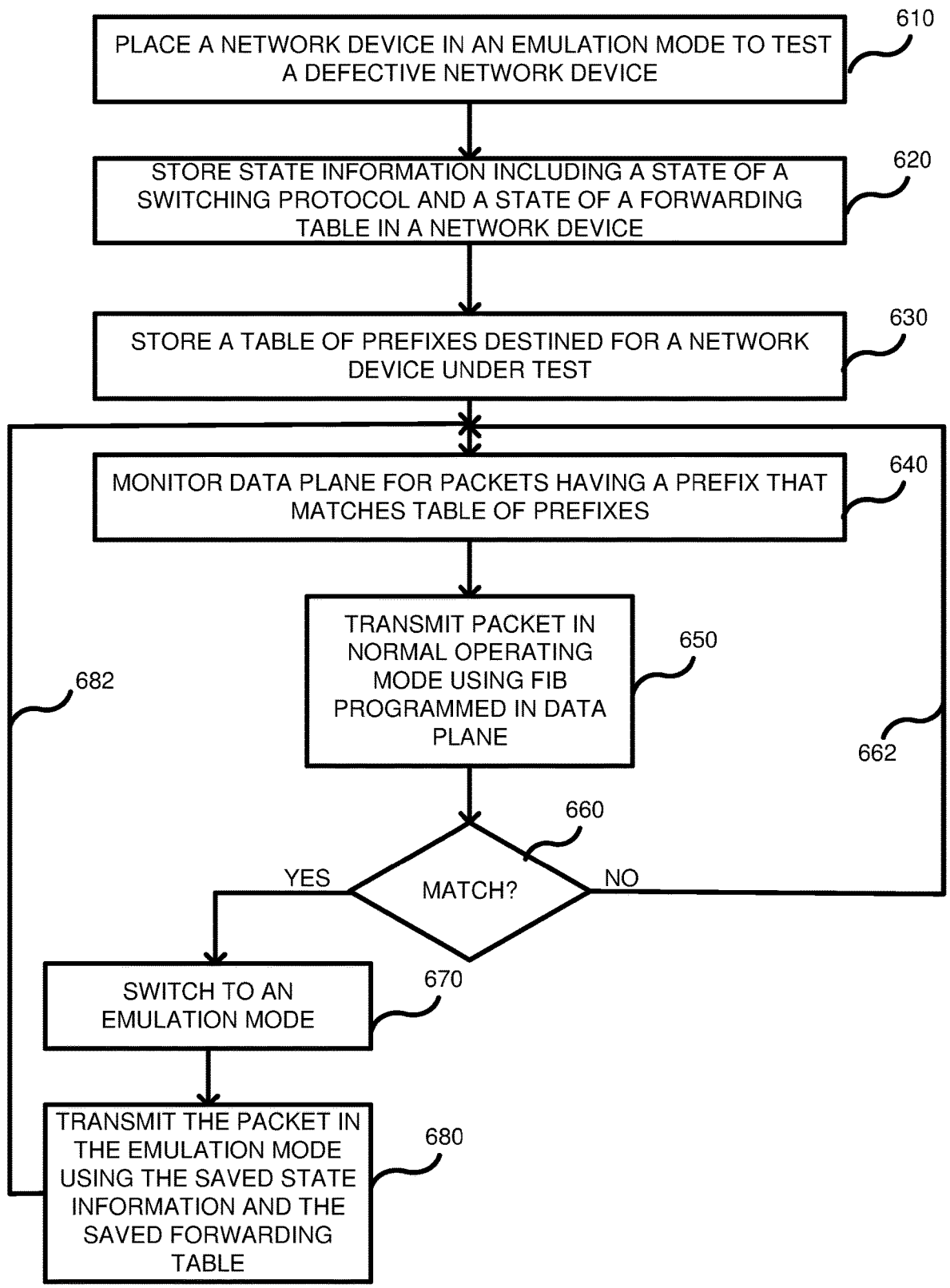
FIG. 6 is a flowchart according to one embodiment for testing a network device using an emulation mode.

FIG. 6 is a flowchart of a method that can be used for testing a network device. In process block 610, a network device is placed in an emulation mode to test a defective network device. In one example, the command can be an API from an emulation management server to a CPU within the network device. Otherwise, the command can be received through a control packet. In process block 620, the CPU can store state information including a state of a switching protocol and a state of a forwarding table in the network device. Additionally, the CPU can generate such state information by reading the current state of the RIB or the current state of the FIB. In process block 630, a table of prefixes destined for the network device under test can be stored, such as is indicated at 398 in FIG. 3. In process block 640, packets received by the network device can be monitored to determine if they have a prefix that matches the table of prefixes. For example, intercept logic 454 (FIG. 4) can monitor incoming packets and determine whether such packets match the emulated prefixes 456. Whether or not there is a match, in process block 650, the packets are transmitted in a normal operating mode using a current FIB programmed within a data plane of the network device. In this way, user traffic can continue to be transmitted regardless of testing of a neighbor device. In decision block 660, a determination is made whether a match has been found. If not, then the process returns to process block 640 as indicated by arrow 662. Alternatively, if decision block 660 is answered in the affirmative, then in process block 670, the network device is switched to an emulation mode. Switching to an emulation mode can include storing state of the network device, such as a state of the forwarding table and the state of rules in the ACL. In process block 680, packets are transmitted in the emulation mode using the saved state information and the saved forwarding table. The process then returns to process block 640 to monitor for new packets received as indicated at 682. Thus, the controller or processor within a control plane of the network device can switch between a normal operating mode and an emulation mode and then back to a normal operating mode. In the process, the network device switches the forwarding information used to transmit the packets. For example, in FIG. 4, the FIB 458 is used in a normal operating mode and the emulation routing information (also called emulation FIB or virtual FIB) is used in the emulation mode. The FIB 458 is typically located within the data plane and is programmed into the switching logic 430. By contrast, the emulation routing information 460 is typically located in the control plane in memory. By switching between which routing information is used, the CPU can simultaneously and effectively route user traffic using the real-time FIB and handle testing of a network device using saved emulation routing information that is based on when emulation was triggered.

Figure 7:
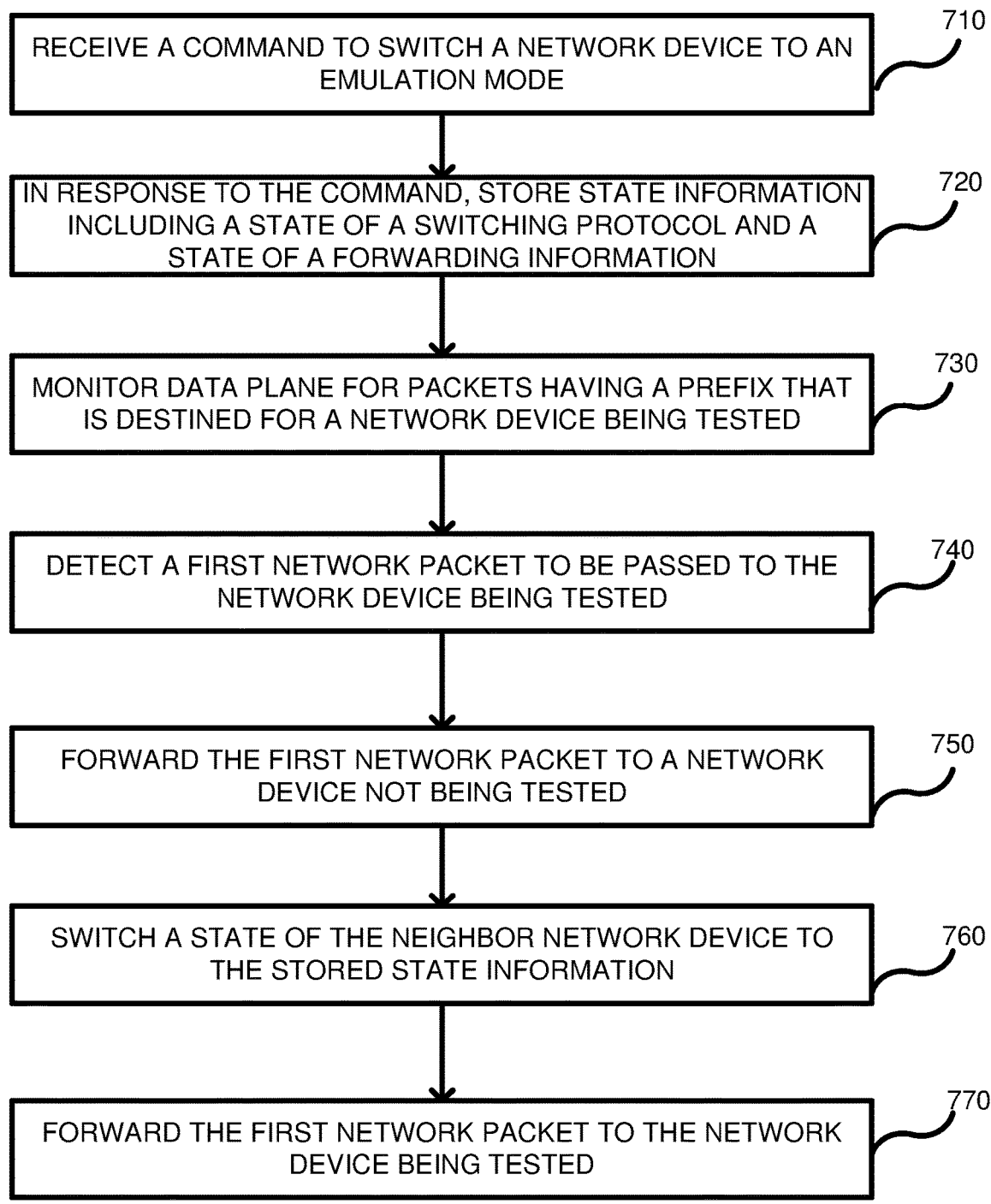
FIG. 7 is a flowchart according to another embodiment for testing a network device using an emulation mode.

FIG. 7 is a flowchart according to one embodiment for testing a network device, such as a router or a switch. In process block 710, a command is received to switch the network device to an emulation mode. The command can be received by the network device as a packet through the data plane or as a separate connection to the processor within the control plane. The command can also identify the network device being tested, such as by providing address information for the network device being tested. In process block 720, in response to the command, state information can be stored including a state of a switching protocol used by the network device and a state of forwarding information for the network device, such as the state of the FIB. In process block 730, the data plane within the network device can be monitored for packets having a prefix that is destined for a network device being tested. Monitoring is typically accomplished via hardware within the data plane, but other techniques can be used. In one example, upon receiving the command to switch to the emulation mode, emulated prefixes (e.g., 398 of FIG. 3) can be populated within the data plane. The emulated prefixes can be derived from the FIB by identifying any prefixes that would be transmitted to the network device being tested. In process block 740, a first network packet is detected that is to be passed to the network device being tested. Thus, intercept logic within the data plane compares the prefixes received with the emulated prefixes that are stored. If a match is found between the prefixes, then the detection is effectively made. It should be noted that not all prefixes need to be checked, as the intercept logic can be programmed to monitor only a percentage of incoming packets for emulated prefixes. In process block 750, a first network packet is forwarded to a network device not being tested. Thus, the network device uses the current programmed FIB within the data plane to forward the packet to an updated port on the network device. By immediately forwarding the packet, the network device ensures that user traffic is not delayed. In process block 750, once a detection is made, the data plane can transmit the packet to the control plane for further processing, including switching the network device to an emulation mode. Switching to the emulation mode can require programming of the switching logic within the data plane, such as programming of the ACL. Additionally, the processor uses the alternative emulation routing information stored within the control plane to identify the appropriate port upon which to forward the packet. In process block 770, the network packet is forwarded to the network device being tested in accordance with the alternative routing information. Thus, the received network packet is forwarded using two different forwarding tables, one of which forwards the packet to the network device being tested and the other of which forwards the packet to a network device not being tested.

Figure 8:
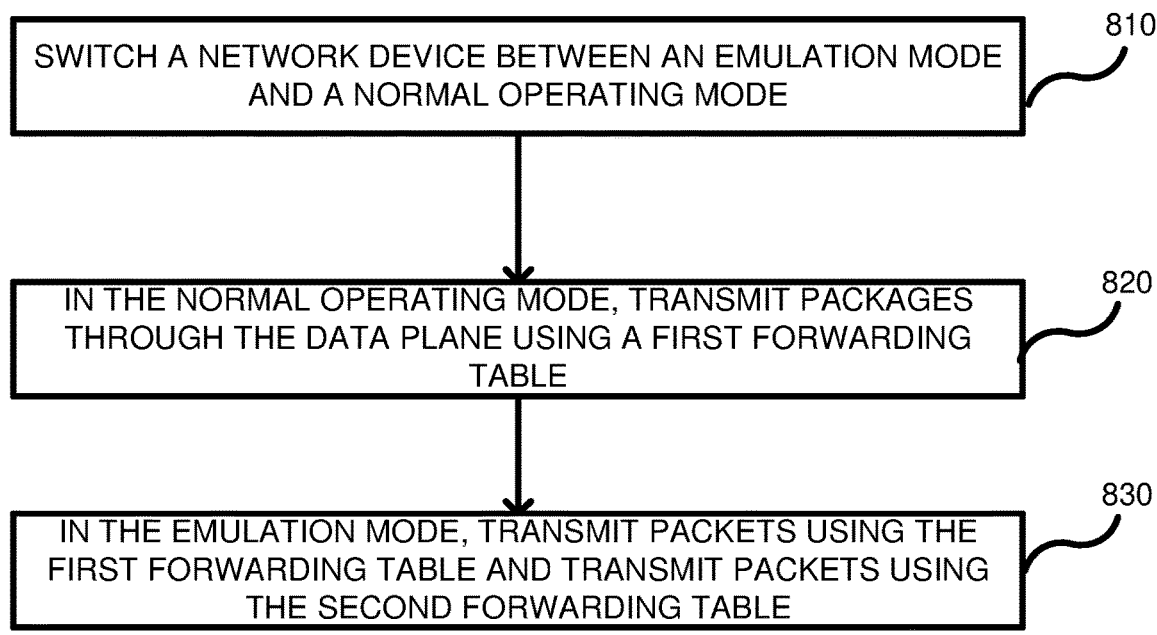
FIG. 8 is a flowchart according to yet another embodiment for testing a network device using an emulation mode.

FIG. 8 is another flowchart according to an embodiment for testing a network device using an emulation mode. In process block 810, a network device is switched between an emulation mode and a normal operating mode. The switching can occur from the normal operating mode to the emulation mode and vice versa. In process block 820, in the normal operating mode, packages are transmitted through a data plane of the network switch using a first forwarding table. Typically, the first forwarding table is a table that is programmed within the switching logic in the data plane of the network device. In process block 830, in the emulation mode, the network device transmits packets using the first forwarding table and transmit packets using a second forwarding table, different than the first forwarding table. The first forwarding table is a table that is updated when update messages are received by the network device. By contrast, the second forwarding table is a snapshot of the first forwarding table at a particular point in time when emulation mode is triggered. Thus, update messages to the network device are only applied to the first forwarding table and not to the second forwarding table. The second forwarding table can be included within a RIB in a control plane of the network device. Alternatively, the second forwarding table can be considered a virtual FIB within the control plane of the network device. In this manner, packets are forwarded differently depending on the mode of the network device.

Figure 9:
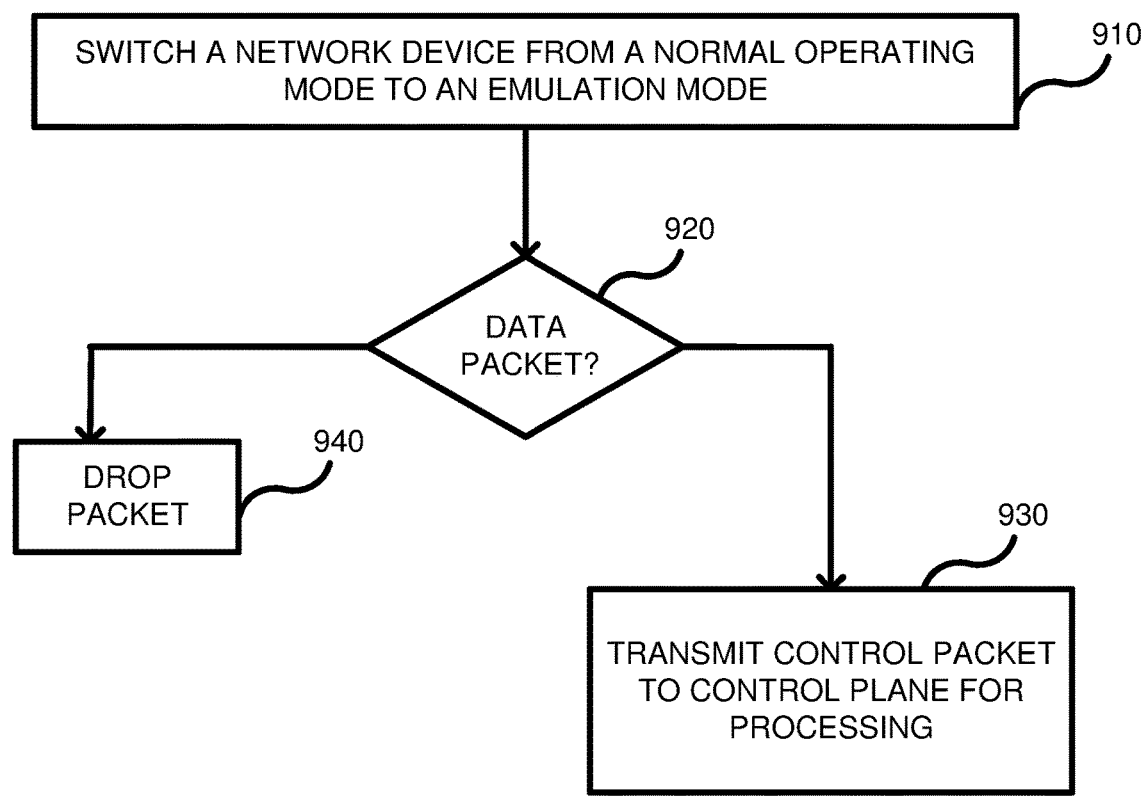
FIG. 9 is a flowchart according to another embodiment for testing a network device using an emulation mode.

FIG. 9 is a flowchart of a method for processing incoming packets received from a network device being tested by a network device in an emulation mode. In process block 910, a network device switches from a normal-operating mode to an emulation mode. In decision block 920, a check is made whether the packet is a data packet or a packet destined for the control plane. For example, a check can be made for the address of the packet and if the address matches the emulated network device, then the packet is passed to the control plane (process block 930). Otherwise, the packet is dropped in process block 940.

Figure 10:
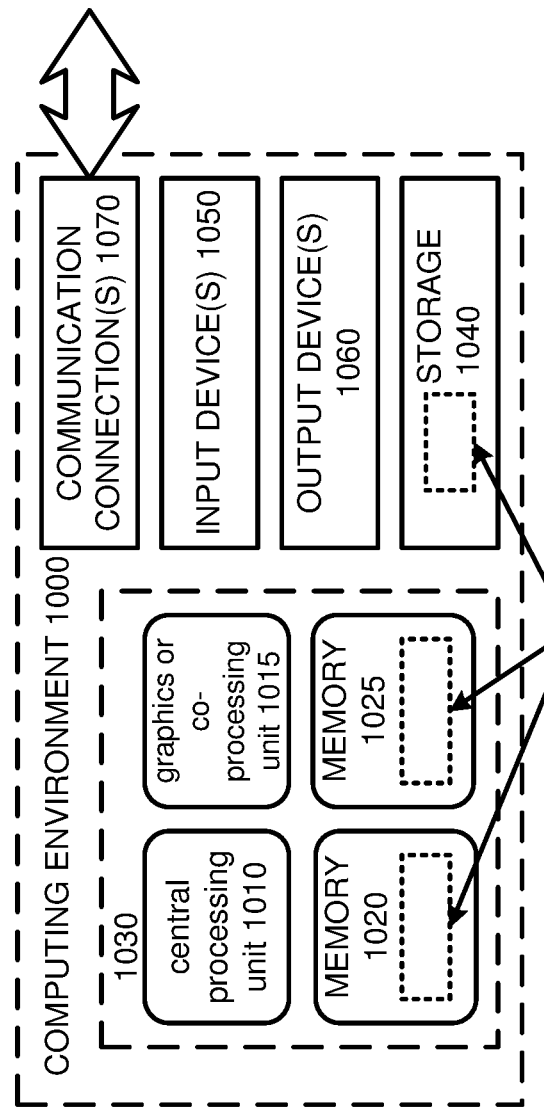
FIG. 10 depicts a generalized example of a suitable computing environment in which the described innovations may be implemented.

FIG. 10 depicts a generalized example of a suitable computing environment 1000 in which the described innovations may be implemented. The computing environment 1000 is not intended to suggest any limitation as to scope of use or functionality, as the innovations may be implemented in diverse general-purpose or special-purpose computing systems. For example, the computing environment 1000 can be any of a variety of computing devices (e.g., desktop computer, laptop computer, server computer, tablet computer, etc.).

With reference to FIG. 10, the computing environment 1000 includes one or more processing units 1010, 1015 and memory 1020, 1025. In FIG. 10, this basic configuration 1030 is included within a dashed line. The processing units 1010, 1015 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power.

For example, FIG. 10 shows a central processing unit 1010 as well as a graphics processing unit or co-processing unit 1015. The tangible memory 1020, 1025 may be volatile memory (e.g., registers, cache, RAM), non-volatile memory (e.g., ROM, EEPROM, flash memory, etc.), or some combination of the two, accessible by the processing unit(s). The memory 1020, 1025 stores software 1080 implementing one or more innovations described herein, in the form of computer-executable instructions suitable for execution by the processing unit(s). The computing environment 1000 of FIG. 10 can be associated with the emulation management server or represent the network devices described herein.

A computing system may have additional features. For example, the computing environment 1000 includes storage 1040, one or more input devices 1050, one or more output devices 1060, and one or more communication connections 1070. An interconnection mechanism (not shown) such as a bus, controller, or network interconnects the components of the computing environment 1000. Typically, operating system software (not shown) provides an operating environment for other software executing in the computing environment 1000, and coordinates activities of the components of the computing environment 1000.

The tangible storage 1040 may be removable or non-removable, and includes magnetic disks, magnetic tapes or cassettes, CD-ROMs, DVDs, or any other medium which can be used to store information in a non-transitory way and which can be accessed within the computing environment 1000. The storage 1040 stores instructions for the software 1080 implementing one or more innovations described herein.

The input device(s) 1050 may be a touch input device such as a keyboard, mouse, pen, or trackball, a voice input device, a scanning device, or another device that provides input to the computing environment 1000. The output device(s) 1060 may be a display, printer, speaker, CD-writer, or another device that provides output from the computing environment 1000.

The communication connection(s) 1070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A method of testing a network device, comprising:
receiving a command to switch a neighbor network device to an emulation mode, wherein the neighbor network device is coupled to the network device being tested;
storing state information of the neighbor network device including a state of a switching protocol and current forwarding information;
monitoring for network packets, received by the neighbor network device, to be passed to the network device being tested;
detecting a received network packet to be passed to the network device being tested;
forwarding the received network packet to a network device not being tested so that the received network packet can be forwarded to its destination;
switching a state of the neighbor network device to the stored state information to enter the emulation mode; and
forwarding the received network packet to the network device being tested to emulate that the network device is in a normal mode of operation;
receiving a packet, in the neighbor network device, from the network device being tested;
if a determination is made that the packet is a data packet that would normally be forwarded, then dropping the data packet while in the emulation mode; and
if a determination is made that the packet is a control packet, then passing the packet to a control plane of the neighbor network device for processing.

2. The method of claim 1, wherein an emulation management server is coupled to multiple neighbor network devices within a network, including the neighbor network device, and the method further includes:
through control by the emulation management server, placing the multiple neighbor network devices, coupled to the network device being tested, in an emulation mode.

3. The method of claim 1, further including storing both a virtual forwarding table and a non-virtual forwarding table within the neighbor network device, wherein the virtual forwarding table is used in the emulation mode and the non-virtual forwarding table is used in a normal operating mode.

4. The method of claim 1, wherein the neighbor network device transmits network traffic to the network device being tested so that the network device being tested is unaware of the emulation mode.

5. A computer-readable storage medium, which is non-transitory, including instructions that upon execution cause a computer system to perform a method comprising instructions to:
switch a network device between an emulation mode and a normal operating mode, the network device including a control plane, having a controller therein, and a data plane for transmitting network packets between an input port and output ports;
in the normal operating mode, transmit first network packets through the data plane of the network device between the input port and the output ports using a first forwarding table;
in the emulation mode, transmit second network packets to the output ports using the first forwarding table and transmit the second network packets to the output ports using a second forwarding table, different than the first forwarding table; and
monitor the second network packets passing through the data plane for emulated prefixes and forwarding the second network packets for which there is a matching emulated prefix.

6. The computer-readable storage medium according to claim 5, wherein the instructions, upon execution, further cause the computer system to:
cause the network device to generate the second forwarding table by saving a current state of the first forwarding table and store the second forwarding table in memory of the control plane.

7. The computer-readable storage medium according to claim 5, wherein in the emulation mode, the network device emulates the normal operating mode to a neighbor network device being tested, while the neighbor network device is not being used to transmit the second network packets to an ultimate destination.

8. The computer-readable storage medium according to claim 5, wherein the control plane changes a state of the data plane to a previous state, the previous state having been saved when the emulation mode was triggered in order to transmit the second network packets to the output ports using the second forwarding table.

9. The computer-readable storage medium according to claim 5, wherein the first forwarding table is programmed into the data plane and the second forwarding table is stored in memory within the control plane.

10. The computer-readable storage medium according to claim 5, wherein the network device is a first network device, and the instructions, upon execution, further cause the computer system to:
switch multiple network devices, including the first network device, into emulation mode in parallel.

11. The computer-readable storage medium according to claim 5, wherein the instructions, upon execution, further cause the computer system to:
generate a trigger signal from a server computer coupled to the network device to switch the network device to an emulation mode.

12. The computer-readable storage medium according to claim 11, wherein the trigger signal is received by multiple network devices that are neighbors to one or more network devices being tested.

13. A system, comprising:
a network device including a processor for management of the network device and including packet handling logic for routing packets through the network device;
a memory for storing first routing information for an emulation mode;
storage for storing packet prefixes to be emulated; and
intercept logic within the packet handling logic that monitors received packets to determine whether prefixes associated with the received packets match the packet prefixes stored within the storage;
wherein the processor is coupled to the memory and is adapted to switch between the emulation mode and a normal operating mode;
wherein the packet handling logic includes second routing information for the normal operating mode of the network device; and
wherein, when it is determined that there is a match, the system is configured to switch from the normal operating mode to the emulation mode and forward packets according to the first routing information.

14. The system of claim 13, wherein the network device is configured to re-transmit a received packet in the normal operating mode using the second routing information, and to re-transmit the received packet in the emulation mode using the first routing information.

15. The system of claim 13, wherein the packet handling logic is configured to drop packets received from a network device being tested during the emulation mode.

16. The system of claim 13, wherein the processor is configured to switch the network device between the emulation mode and the normal operating mode based on a received triggering command from an external monitoring server computer.

17. The system of claim 13, wherein a protocol state is saved within the memory, wherein the protocol state is a state of a communications protocol at a time that emulation mode was entered.

* * * * *